(12) United States Patent
Furbeck

(10) Patent No.: US 8,244,901 B2
(45) Date of Patent: Aug. 14, 2012

(54) METHODS AND APPARATUS TO FACILITATE CLIENT CONTROLLED SESSIONLESS ADAPTATION

(75) Inventor: David Furbeck, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/244,730

(22) Filed: Sep. 26, 2011

(65) Prior Publication Data

US 2012/0017004 A1 Jan. 19, 2012

Related U.S. Application Data

(63) Continuation of application No. 12/814,566, filed on Jun. 14, 2010.

(60) Provisional application No. 61/187,090, filed on Jun. 15, 2009.

(51) Int. Cl.
*G06F 15/16* (2006.01)
(52) U.S. Cl. ........ 709/231; 709/217
(58) Field of Classification Search ............ 709/203, 709/231, 217
See application file for complete search history.

(56) References Cited

U.S. PATENT DOCUMENTS

| 7,624,337 B2* | 11/2009 | Sull et al. | 715/201 |
| 8,010,566 B2* | 8/2011 | Cho et al. | 707/791 |
| 2002/0069218 A1* | 6/2002 | Sull et al. | 707/501.1 |
| 2006/0037057 A1 | 2/2006 | Xu | |
| 2007/0033515 A1* | 2/2007 | Sull et al. | 715/500.1 |
| 2008/0250047 A1 | 10/2008 | Hannuksela | |
| 2010/0185854 A1* | 7/2010 | Burns et al. | 713/165 |
| 2011/0093492 A1* | 4/2011 | Sull et al. | 707/769 |

FOREIGN PATENT DOCUMENTS

EP 1349164 10/2003

OTHER PUBLICATIONS

International Preliminary Examination Authority, International Preliminary Report on Patentability issued in PCT/US2010/038481, mailed on Sep. 5, 2011, 7 pages.
International Searching Authority, International Search Report and Written Opinion issued in PCT/US2010/038481, mailed on Nov. 15, 2010, 11 pages.
3GPP TS 26.234 V8.2.0 (Mar. 2009), 3rd Generation Partnership Project; Technical Specification Group Services and System Aspects; Transparent end-to-end Packet-switched Streaming Service (PSS); Protocols and codecs (Release 8), 2009, 155 pages.

(Continued)

*Primary Examiner* — Kristie Shingles
(74) *Attorney, Agent, or Firm* — Hanley, Flight & Zimmerman, LLC

(57) ABSTRACT

A disclosed example method for managing media content includes retrieving metadata for a plurality of encodings of the media content, wherein the metadata includes a first uniform resource locator (URL) and a first set of byte offsets for a first portion of the media content having a first encoding and a second URL and a second set of byte offsets for a second portion of the media content having a second encoding. The example method also includes requesting the first portion of the media content utilizing the first URL and the first set of byte offsets.

27 Claims, 8 Drawing Sheets

OTHER PUBLICATIONS

3GPP TS 26.244 V8.0.0 (Dec. 2008), 3rd Generation Partnership Project; Technical Specification Group Services and System Aspects; Transparent end-to-end packet-switched streaming service (PSS); 3GPP file format (3GP) (Release 8), 2008, 52 pages.

ISO/IEC 14496-12, Information technology—Coding of audio-visual objects—Part 12: ISO base media file format, third edition, Oct. 15, 2008, 120 pages.

* cited by examiner

METHODS AND APPARATUS TO FACILITATE CLIENT CONTROLLED SESSIONLESS ADAPTATION

RELATED APPLICATIONS

This patent is a continuation of U.S. patent application Ser. No. 12/814,566, filed on Jun. 14, 2010, which claims the benefit of U.S. Provisional Patent Application No. 61/187,090, filed on Jun. 15, 2009, both of which are hereby incorporated herein by reference in their entireties.

FIELD OF THE DISCLOSURE

The present disclosure relates generally to wireless media delivery and, more particularly, to methods and apparatus to facilitate client controlled sessionless adaptation.

BACKGROUND

User equipment (UE) may receive and display media content to a user in response to a request. When one or more requests for media are requested by the UE, media content may be streamed to the UE by way of a number of protocols, such as the Real Time Streaming Protocol (RTSP).

To provide the UE with streaming media content, the UE sends one or more commands to a media server, and the media server responds with a description, such as by way of the Session Description Protocol (SDP). As media content is streamed to the UE, the media server typically maintains an active session throughout.

DETAILED DESCRIPTION

Figure 1:
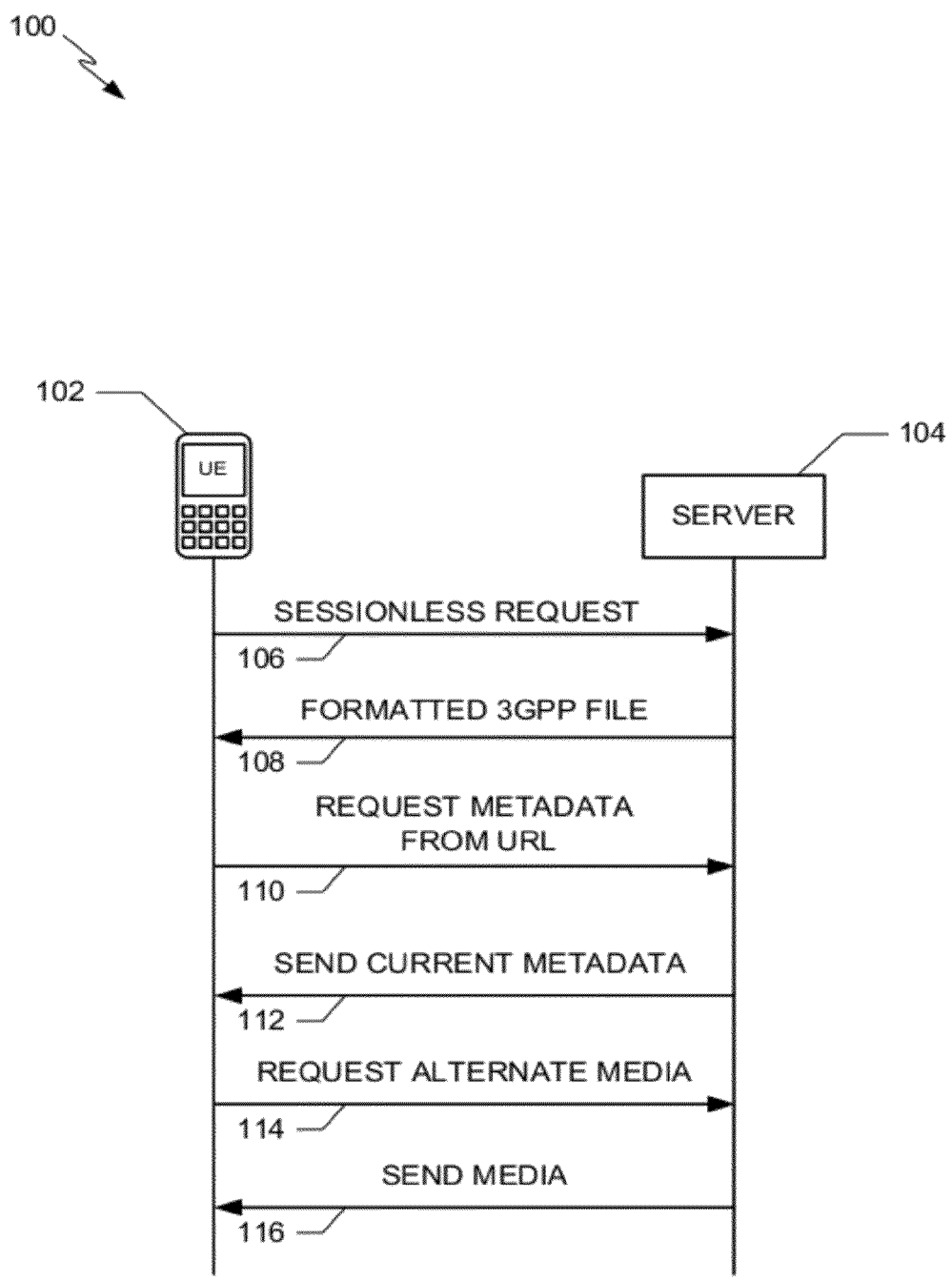
FIGS. 1, 2A, and 2B illustrate example message flow between user equipment (UE) and a server to facilitate client controlled sessionless adaptation.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus described herein can be used by user equipment (UE) to control the type of media parameters rendered on the UE based on one or more channel conditions and/or current conditions of the UE. The UE may render any type of media including, but not limited to audio (e.g., MP3 audio) and/or video, and media parameters may include, but are not limited to a media bit-rate, a media resolution, etc. Although media content providers encode media content at one or more different configurations (referred to herein as "encoded media configurations"), each having one or more different bit rate(s), resolution(s), sizes, etc., the device(s) on which the media content is rendered do not participate in selecting which encoded media configuration is most appropriate based on current conditions. As used herein, the term adaptation relates to a circumstance in which media content is modified and/or selected to be delivered in a format better suited by current channel conditions and/or capabilities of the UE. From a user's point of view, adverse channel conditions and/or UE limitations (e.g., the UE's ability to render media at a certain bit-rate, resolution, a UE processor speed limitation, etc.) may manifest as choppy audio/video (A/V), relatively long pauses and/or buffering times, and/or A/V that is not in sync. The UE referred to herein may include, but are not limited to mobile communication devices, mobile computing devices, or any other device capable of communicating wirelessly with a wireless network. Such devices, also referred to as terminals or wireless terminals, may include mobile smart phones (e.g., a BLACKBERRY® smart phone), wireless personal digital assistants (PDA), laptop/notebook/netbook computers with wireless adapters, etc. The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including other WLAN standards, personal area network (PAN) standards, wide area network (WAN) standards, or cellular communication standards.

The example methods and apparatus are described herein in connection with the wireless local area network (WLAN) communication standard known as IEEE® (Institute for Electrical and Electronics Engineers) 802.11, which, among other things, defines interworking with external networks. However, the example methods and apparatus may additionally or alternatively be implemented in connection with other wireless communication standards including other WLAN standards, personal area network (PAN) standards, wide area network (WAN) standards, or cellular communication standards.

The user experience associated with known techniques or standards for streaming media content from a server to a UE includes several limitations. For example, traditional streaming of media content employs the Real Time Streaming Protocol (RTSP), which is a client/server protocol enabling real-time and/or near real-time streaming. Generally speaking, in operation of requesting media from a server, a UE sends a DESCRIBE command to a media server, and the media server responds with a presentation description (e.g., SDP (Session Description Protocol)). The SDP information includes a description of the overall media presentation and/or each stream that is used to make-up the presentation. The client may then receive the desired media via Internet protocol (IP), user datagram protocol (UDP), or RTP (Real Time Protocol) packets. However, in this situation, additional control is still required before the media begins to stream to the UE or display on the UE, such as a client issued SETUP command, a PLAY command, and a TEARDOWN command when the client is finished with the media.

While the traditional RTSP streaming techniques avoid a need for a permanent transmission control protocol (TCP) connection between the client and the media server, the media server must be capable of maintaining an active session for each and every client that requests media. Additionally, RTSP streaming sends packets to the client at an average rate or at a rate in which the media was encoded, and while a rate packet transmission may be throttled based on a buffer fullness state, traditional streaming and/or packet switched streaming (PSS) still exhibit issues related to getting through firewalls, network address translation (NAT), and require relatively expensive streaming servers. Standard web servers, unlike media streaming servers, typically cost significantly less than media streaming servers and employ Hypertext Transfer Protocol (HTTP) in a stateless manner. In other words, industry standard web servers may employ HTTP (e.g., HTTP 1.1) without the extra processing power and/or complexity associated with setup, maintenance, and/or teardown of state-based communication protocols (e.g., RTSP). As such, media streaming servers typically suffer an inability to scale well due to, in part, significant processing requirements as demand grows. Standard web servers, on the other hand, are sometimes referred to as "dumb" servers that return the content that is requested by a client, which minimizes complexity, cost, and scales better than the more costly media streaming servers.

FIG. 1 illustrates an example message exchange 100 between user equipment (UE) 102 and a server 104 associated with pre-recorded media stream(s) (i.e., not live). As described in further detail below, the example server 104 may be a standard web server or a similar HTTP server. In one example, the system may employ one or more media streaming servers (not shown) to facilitate media streaming to a wireless device, the methods and apparatus described herein allow cost judicious servers to be utilized rather than relatively costly media streaming servers. To initiate receipt of media, the example UE 102 generates a sessionless request to the example server 104 (106). The sessionless request (106) may include an HTTP request that identifies a third-generation partnership project (3GPP) file identified by a uniform resource locator (URL) associated with a selection made by a user of the example UE 102. Additionally or alternatively, the example sessionless request may include a byte range of the file to download, such as by way of a GET command supported in HTTP 1.1. In response to receiving the sessionless request (106), the example server 104 provides the corresponding identified 3GPP file, which includes a series of objects referred to as boxes. Each box in the 3GPP file may contain media information or metadata, such as media (e.g., audio, video, etc.) constructed with predetermined media characteristics (e.g., a predetermined resolution, a predetermined bitrate, a predetermined codec, and/or any combination thereof).

The example server 104 transmits the 3GPP file to the UE 102 (108) to allow media contained therein to be rendered by the UE 102. Additionally, the example UE 102 parses the received 3GPP file for object boxes to identify whether one or more alternate permutations of media characteristics are available at the server 104. Unlike traditional streaming, in which the server controls adaptation and/or the rate at which packets are sent to UE (e.g., typically a real-time rate equivalent to the rate at which the media was encoded), the methods and apparatus described herein allow the UE to control media characteristics associated with the stream(s) in a manner that employs traditional web servers rather than one or more media streaming servers that are relatively costly. As a result, the UE 102 may control one or more decisions related to media stream bit-rate, resolution, etc. based on, for example, one or more current conditions of the UE 102 (e.g., channel congestion, signal strength degradation, etc.) and/or one or more capabilities of the UE 102 (e.g., buffer fullness, UE processor capabilities/speed, etc.). Additionally, traditional streaming typically employs the RTSP, which requires processing resources from both the UE and the server to maintain one or more sessions. Such processing resources are particularly onerous on media servers that must maintain the session for each current streaming instance, even when the UE is not performing one or more control functions (e.g., play, stop, forward, reverse, skip, etc.). On the other hand, the methods and apparatus described herein employ HTTP streaming, which eliminates any session maintenance requirements, thereby reducing server complexity and/or cost.

After the example UE 102 receives the 3GPP file (108) and parses the received 3GPP file for URL metadata indicative of available alternate media characteristics, the UE 102 navigates to the parsed URL to request any additional metadata contained therein (110). The additional metadata returned from the example server 104 (112) may include, but is not limited to additional/alternate media characteristics for the media content, information indicative of whether the media is live, fragment index value(s), and/or byte offset values to enable seeking. As described in further detail below, with the additional metadata, the example UE 102 may request one of the alternate media streams having the alternate media characteristics (e.g., a lower bitrate, a lower resolution, an alternate codec, etc.) (114). For example, the UE 102 may request an alternate media stream based on degraded channel conditions, buffer fullness, and/or limitations of the UE to render media at relatively high bit-rates, resolutions, etc. The example server 104 responds to the request by sending the selected media content (116).

Figure 2A:
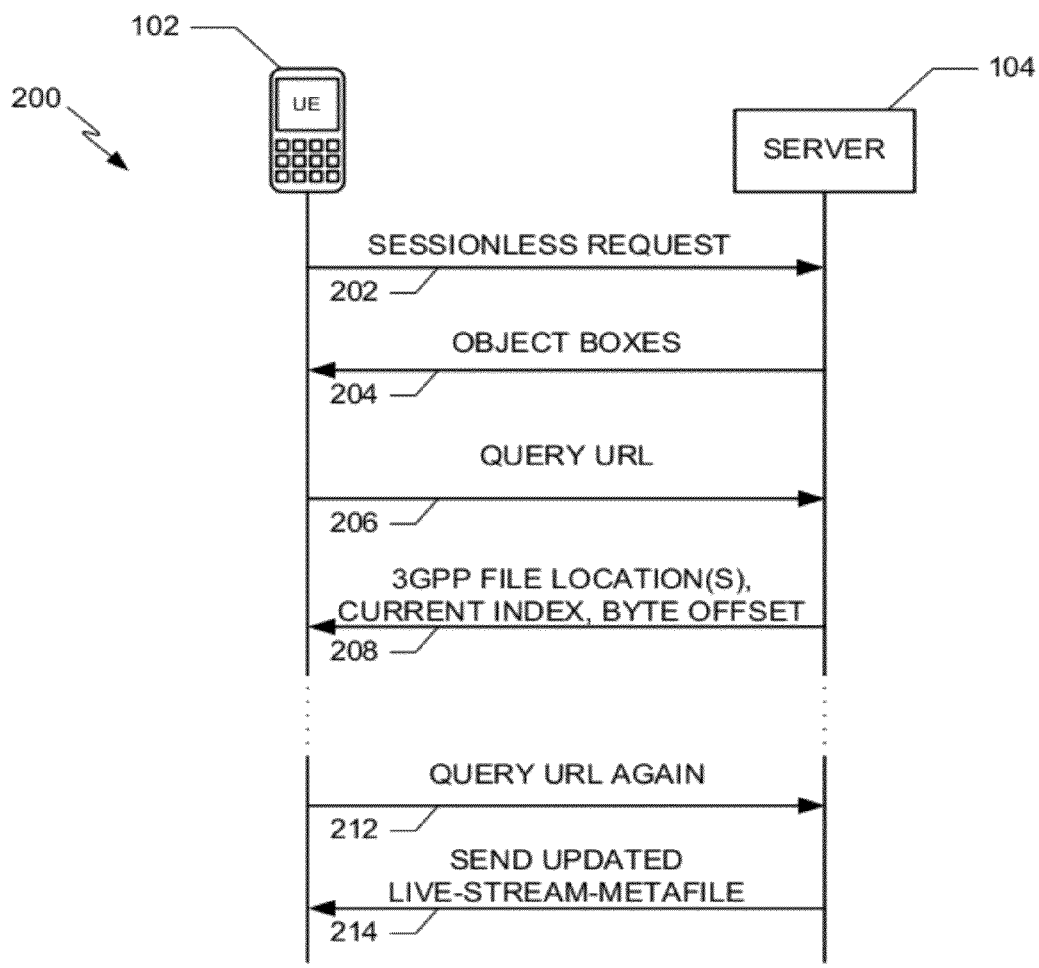

FIG. 2A illustrates an example message exchange 200 between the UE 102 and the server 104 for a situation in which the media content provided via the server 104 is live rather than pre-recorded. During an attempt by the UE 102 to receive a live 3GPP file (e.g., a series of related 3GPP file fragments stored on the server 104 by the media content creator or distributor (e.g., broadcaster)), a client using the UE 102 may prefer to seek directly to the live (e.g., most recent) fragment rather than start at a prior time period of viewing. For example, some live streaming requests may initiate from the UE 102 after the live event has occurred for a relatively long time period (e.g., several minutes, hours, etc.), and the client may attempt to seek via the UE 102 to the most recent available 3GPP file of the series. While traditional streaming techniques typically allow 3GPP files to be parsed in an effort to identify the most recent available media, such techniques are process intensive and time consuming. The methods and apparatus described herein allow efficient seeking of live streaming content by maintaining and/or otherwise receiving a live-stream-metafile that is updated on a continuous, periodic, aperiodic, and/or scheduled basis. As such, one or more specific seeking locations of the 3GPP file fragments may be identified after the example UE 102 accesses the updated live-stream-metafile to locate a current file fragment index value and/or a byte offset value.

In the illustrated example of FIG. 2A, the UE 102 generates a sessionless HTTP request to the example server 104 (202), and receives object boxes having metadata and media information (204). As described in further detail below, the received object boxes may include, but are not limited to, information indicative of whether the media is live, a URL to reference additional metadata (e.g., to minimize 3GPP metadata payload size), a list of available media having alternate media characteristics, a list of available 3GPP file location(s)

associated with the alternate media characteristics (e.g., URLs), and/or SDP information. The example UE 102 queries the received URL (206) and receives additional metadata, if any (208). In the event that the metadata received from the server (202) is complete and/or if additional metadata and/or URLs are not provided, exchanges 206 and/or 208 may be eliminated.

To allow the UE 102 to seek directly to a desired location of media, the UE 102 selects a fragment index value and/or a byte offset value from the live-stream-metafile provided by the server 104 (210). As the live media continues, the party providing the media content (e.g., a broadcaster) updates the live-stream-metafile at the location specified by the received URL (206), which may be stored on the server 104 and/or any other location (e.g., another server, a network storage resource, an Internet resource, etc.). In the event that the client of the UE 102 wishes to seek to an alternate 3GPP fragment index location and/or reconfirm where the most recent fragment index is located, the UE 102 may determine whether previously retrieved metadata is believed to be current. For example, in the event that the previously retrieved metadata is several minutes old, during which updated fragment index values and/or byte offset values may be available, the UE 102 may query the URL again (212) and await a response from, for example, the server 104 containing an updated live-stream-metafile (214), which contains updated fragment index values and/or updated data offset values. The UE 102 may query the URL on a periodic, aperiodic, scheduled, and/or manual basis to maintain awareness of current 3GPP file details associated with the live media content.

Figure 2B:
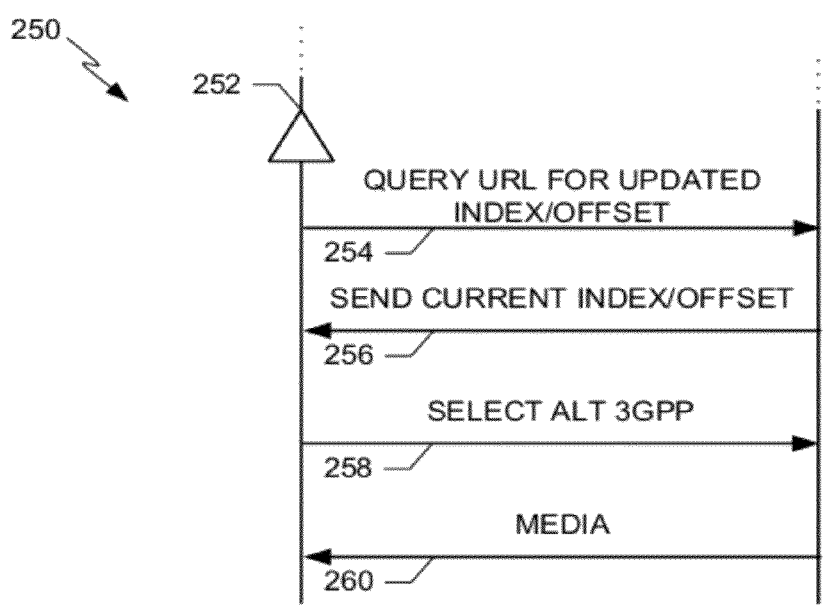

FIG. 2B illustrates an example message exchange 250 between the UE 102 and the server 104 that allow the UE 102 to control adaptation in response to user preferences and/or changing channel conditions. In the illustrated example of FIG. 2B, the exchange 250 begins after the server 104 has transmitted a first instance of metadata and/or media, such as the transmission shown by exchange 204. In response to changed channel conditions 252 by the example UE 102, the UE 102 queries the URL (e.g., the URL provided in exchange 212 of FIG. 2A) to identify whether alternate media having alternate media characteristics is available (254). On the other hand, the example UE 102 may already have the metadata indicative of available bitrates, resolutions, etc. by virtue of the previous sessionless request 202. The example server 104 responds with metadata indicative of 3GPP file location(s) and corresponding media characteristics available to the UE 102 (256). Based on available media characteristics, the example UE 102 selects a 3GPP file that addresses the changed channel conditions 252. Changed channel conditions may include, but are not limited to, decreased channel bandwidth (e.g., due to channel crowding), increased dropout conditions, co-channel interference, fading, increased latency values, and/or increased jitter. Additionally or alternatively, degraded performance may be due to one or more limitations of the UE 102, such as the ability of the UE 102 to process/render media at a certain bit-rate and/or resolution. Such degradation in channel conditions and/or UE 102 performance may be verified by one or more thresholds on the UE 102 that, when exceeded (e.g., exceeding a lower threshold of performance, exceeding an upper threshold of performance) allow the UE 102 to request a 3GPP file that is less susceptible to poor channel conditions. In other words, lower bit rate 3GPP files, lower resolution 3GPP files, and/or 3GPP files having alternate codecs may result in a better client experience at the UE 102 when bandwidth is limited due to poor channel conditions. The example UE 102 selects the alternate 3GPP file (258), such as a 3GPP file having a lower bit rate, and the example server 104 responds by streaming the selected 3GPP file via HTTP (e.g., a server response to a client HTTP GET command) (260).

On the other hand, in the event that channel conditions improve, the example UE 102 may issue another request to the server 104 for a 3GPP file that can be accommodated by the improved channel conditions. In other words, the UE 102 may request a relatively high resolution and/or high bit-rate 3GPP file when channel conditions maintain sufficient bandwidth for a given amount of time. As described above, the UE 102 may monitor channel conditions on a periodic, aperiodic, scheduled, and/or manual basis to collect channel measurements (e.g., channel jitter, channel latency, etc.) and compare such measurements to one or more thresholds. If such channel conditions exceed one or more thresholds in a favorable manner (e.g., measured bit-rate values exceed a minimum bit-rate threshold value for high-resolution wireless video), the UE 102 may request one or more 3GPP files (e.g., 3GPP files having a higher resolution, higher bit rate, etc.) that operate favorably under such changed conditions.

Figure 3:
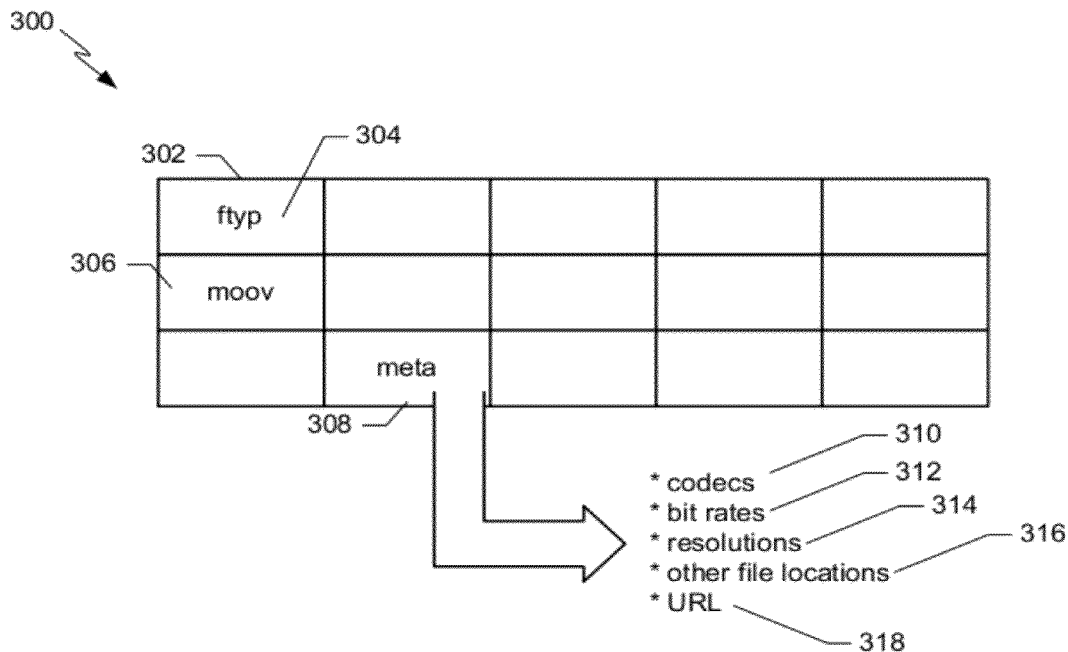
FIGS. 3 and 4 illustrate example 3GPP file object boxes that may be implemented to facilitate client controlled sessionless adaptation.

FIG. 3 illustrates an example portion of 3GPP file object boxes 300 implemented in accordance with this disclosure. Generally speaking, the 3GPP file format conforms to the requirements set forth in 3GPP TS 26.244, which is based on ISO/IEC 14496-12 ISO Base Media File Format (referred to as the MP4 file specification). 3GPP files are arranged as a series of hierarchical objects called boxes, each of which contain media or metadata. Each box has an associated box-type, which is typically a 4-character name and an associated size (e.g., a 32 bit unsigned integer). While some boxtypes are mandatory and found within each 3GPP file, the MP4 specification includes a number of optional boxtypes. Boxtype hierarchy identifies a top-level box in a left-most column, such as the left-most column 302 of FIG. 3. A boxtype "ftyp" (file-type) 304 usually occurs first in a given 3GPP file. A "moov" box (movie box) 306 stores metadata for a presentation and occurs at a top-level (left-most) of a 3GPP file. A "meta" box (308) contains descriptive and/or annotative metadata for the 3GPP file, which may include, but is not limited to available codecs 310, available bit rates 312, available resolutions 314, other file locations 316, and/or a URL to which additional metadata may be located 318.

In the illustrated example of FIG. 3, the example "meta" box 308 is included under the higher-level "moov" box 306 to allow early downloading and/or parsing by the example UE 102 after the corresponding 3GPP file is transmitted by the server 104. Generally speaking, as the server 104 transmits the 3GPP file to the UE 102, the UE 102 may immediately begin parsing the 3GPP file as it arrives. In the event that the UE 102 immediately requires one or more alternate media having, for example, a lower resolution, the UE 102 may make another request to the example server 104 without waiting for the remaining portion of the 3GPP file to download. In other words, the UE 102 may be more responsive to known channel conditions by discontinuing downloading of current media content in favor of alternate media content that is likely to perform better based on the current channel conditions and/or capabilities of the UE 102. On the other hand, the example "meta" box 308 may be located, instead, in the left-most column 302 and at a lower row-level in an effort to allow streamed content to appear on the example UE 102 as soon as possible.

Adaptation may include one or more files structured as a "moov" box with or without a "meta" box. Additionally, the example 3GPP file(s) may include one or more fragments that are time-aligned in which each fragment begins with a random access point. As such, switching between files may be performed. File identification may further be facilitated via one or more brand identifiers, thereby providing a client with an indication that metadata linking to other files is possible.

Figure 4:
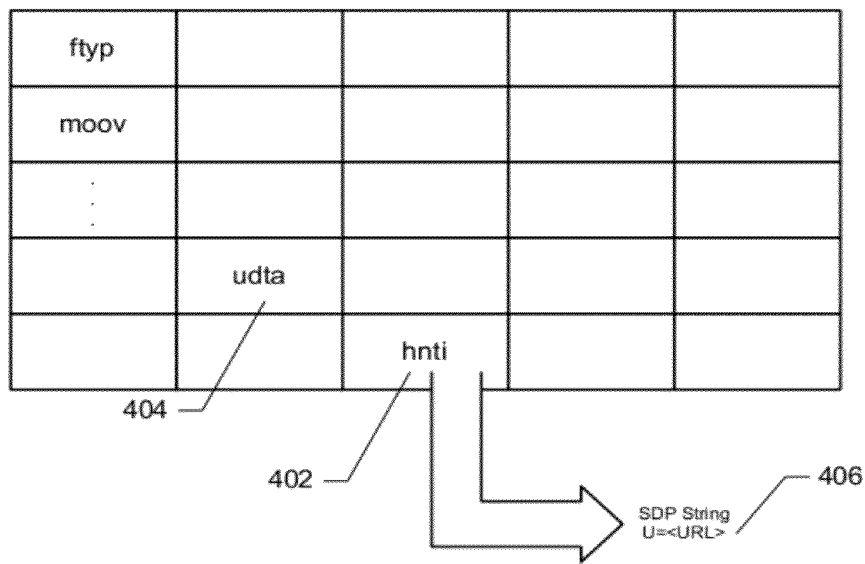

In the illustrated example of FIG. 4, an example portion of 3GPP file object boxes 400 includes an "hnti" (hint) box 402. The "hnti" box 402 is an extension of a user-data boxtype "udta" 404 and includes SDP information. Although SDP information is typically associated with session-based communication rather than HTTP communications, one or more SDP parameters may be embedded within the "hnti" box 402 to direct the example UE 102 to a URL containing additional metadata. For example, SDP includes a number of fields, including a "u=" field 406 associated with a URL. The example server 104 may append a URL to the "u=" field 406, and further embed the "u=" field 406 in the "hnti" box 402 to allow the UE 102 to locate additional metadata upon receipt.

Figure 5:
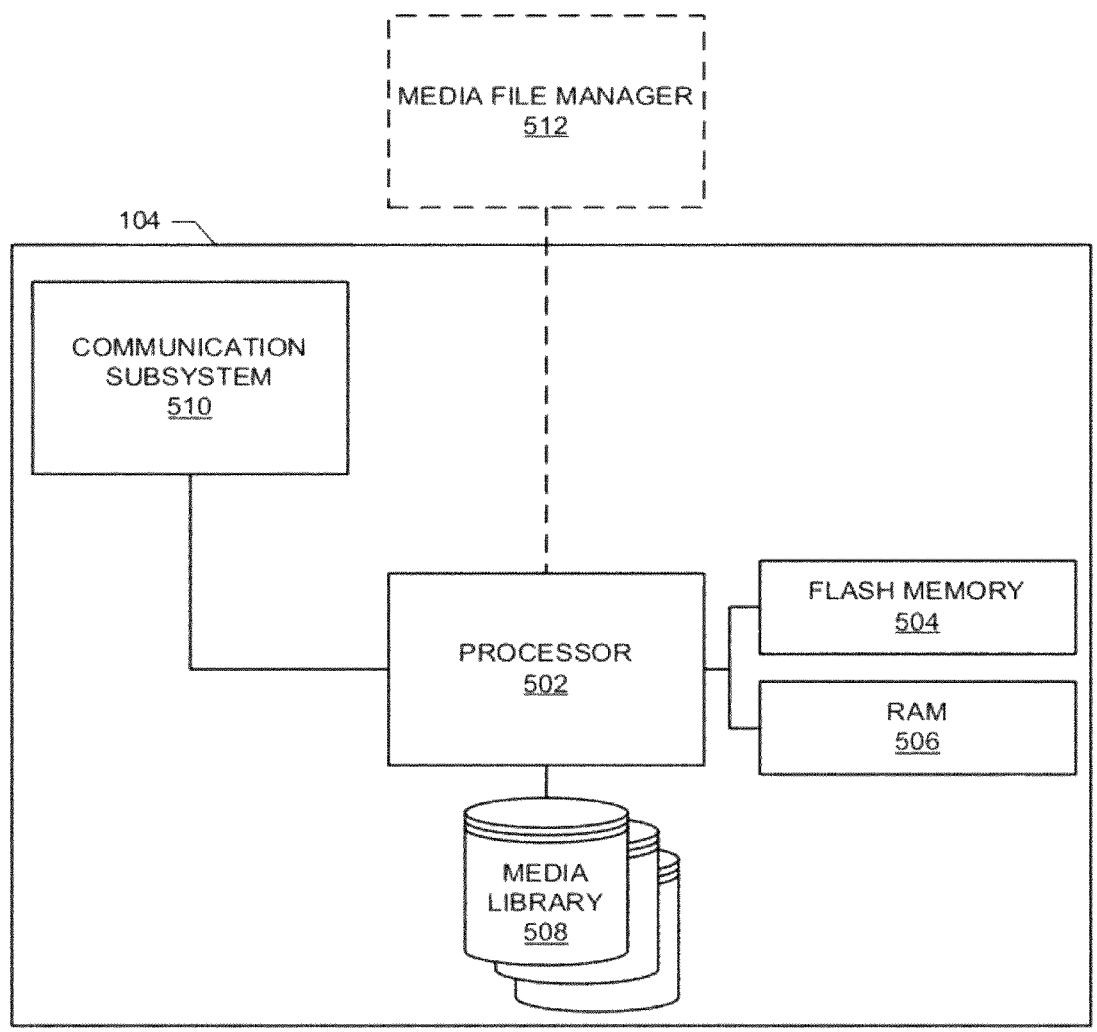
FIGS. 5 and 6 illustrate an example server that can be implemented in accordance with this disclosure.

FIG. 5 is an example server 104 that can be implemented in accordance with this disclosure. The example server 104 of FIG. 5 includes a processor 502 to perform the overall operations of the server 104, a flash memory 504, random access memory 506, and a media library 508, all of which are coupled to the processor 502. As described above, the example server 104 may be a standard web server as known by persons having ordinary skill in the art. To communicate with the UE 102, the example server 104 includes a communication subsystem 510 to facilitate networked communication (e.g., wireless local area network communication via IEEE® (Institute for Electrical and Electronics Engineers) 802.11 and/or wireless communication in Universal Mobile Telecommunication System (UMTS) Terrestrial Radio Access Networks (UTRANs)). The example communication subsystem 510 may be substantially similar to the example communication subsystem 711 described below in connection with FIG. 7. The example server 104 of FIG. 5 may be communicatively connected to an optional media file manager 512 to generate and/or otherwise manage object box contents of 3GPP files sent from the server 104 to one or more UEs, such as the example UE 102 of FIGS. 1, 2A, and 2B.

In operation, the example communication subsystem 510 receives an HTTP connection from the UE 102 with a request for media, such as a standard HTTP GET command. Media requests may include URLs typed and/or otherwise selected by a user of the UE 102 that direct a TCP transmission to the server 104. The example server 104 retrieves a 3GPP media file associated with the request from, for example, one or more media libraries 508, which may be implemented as one or more databases internal and/or external to the server 104. In some examples, the party providing the media builds 3GPP file(s) to conform to one or more boxtype order and/or configurations. In other examples, the example media file manager 512 builds and/or otherwise modifies the retrieved 3GPP file to conform with boxtypes and/or boxtype hierarchical placement. For example, the example media file manager 512 may include the "meta" box 308 as a dependent on the "moov" box 306 so that a target UE 102 can identify available alternate media content as soon as possible after receipt, as shown in FIG. 3. On the other hand, the example media file manager 512 may include the "meta" box 308 as a stand-alone first-tier box. Upon completion of building and/or augmenting the selected 3GPP file, the example communication subsystem 510 transmits the 3GPP file to the requesting UE 102 via HTTP. However, the example methods and apparatus described herein to facilitate client controlled sessionless adaptation may be employed with an industry standard HTTP web server.

The example media file manager may build and/or augment the selected 3GPP file to include SDP information. As described above, the "u=" field 406 may be populated with a URL to allow the receiving UE 102 to identify a location for which additional metadata is stored. Use of the example "u=" field 406 allows, for example, a reduction in metadata payload for the selected 3GPP file(s). As a result, media content received by the UE 102 may render sooner because there is less metadata payload information to transfer from the server 104 to the UE 102.

Figure 6:
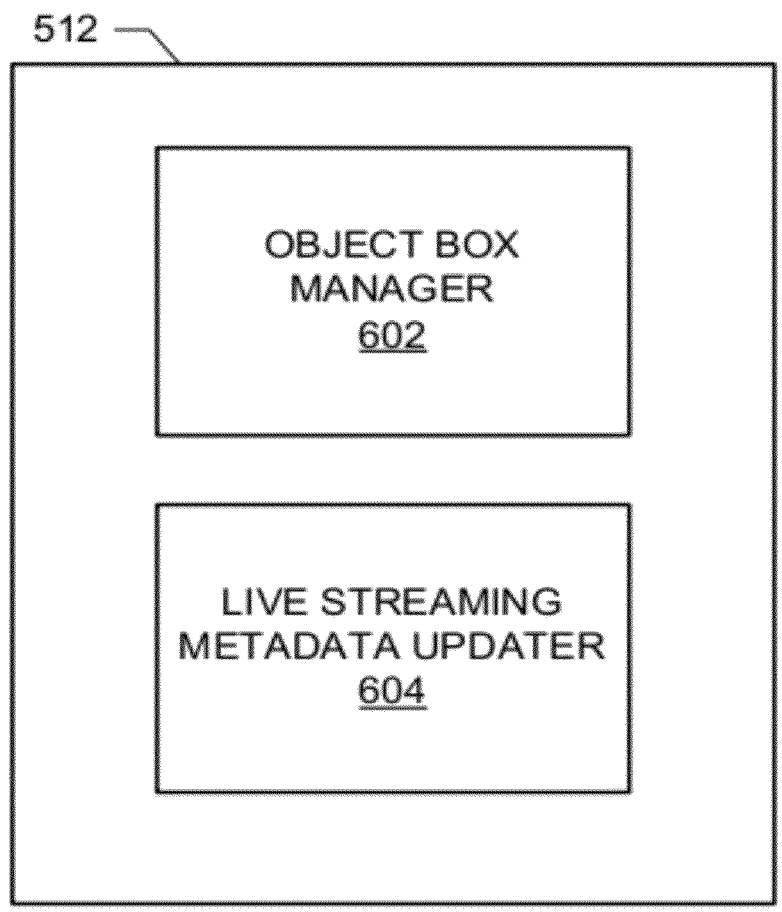

FIG. 6 illustrates additional detail of the example media file manager 512 of FIG. 5. In the illustrated example of FIG. 6, the media file manager 512 includes an object box manager 602, and a live streaming metadata updater 604. In operation, the example object box manager 602 builds, arranges, and/or appends object boxes to the selected 3GPP file in a manner that allows the UE 102 to become aware of what content is available on the server 104. As such, the UE 102 may participate in media adaptation based on, for example, transmission preferences and/or existing channel conditions of the UE 102. The example object box manager 602 may arrange one or more object boxes in a hierarchical order based on one or more box order profiles stored in a memory, such as the example flash memory 504.

Profiles may include, but are not limited to, object box order configurations that promote media rendering as soon as possible after receipt by the UE 102 by minimizing the metadata payload of any selected 3GPP file. Such payload minimization may be accomplished by the object box manager 602 including a metadata reference URL in the "meta" box 308 rather than one or more discrete metadata value types. Additionally or alternatively, the example object box manager 602 may employ the "hnti" box 402 by utilizing the "u=" field 406 to associate a metadata reference URL. On the other hand, the example object box manager 602 may order one or more object box configurations in a manner to promote early awareness of media adaptation options for the UE 102 by, for example, including metadata early in the 3GPP file. As such, the UE 102 may parse one or more boxes (e.g., the "meta" box 308) soon after the initial "ft" box 304 to learn of alternate encoded media configuration files better suited for current channel conditions. As such, the example UE 102 may immediately stop all attempts for a pending 3GPP file download in favor of an alternate (e.g., a lower bandwidth) media file.

The example live streaming metadata updater 604 may operate on a periodic, aperiodic, scheduled, and/or manual basis to update the live-stream-metafile (see exchange 214 of FIG. 2A). As described above, prerecorded media typically includes a relatively thorough compilation of metadata to describe individual tracks and/or seek points within the media to enable, for example, seek operations, play, rewind, fast-forward, etc. However, live media content typically contains less associated metadata to allow for such control. As such, the media content creator typically only has enough time and/or processing power to generate fragment index values and/or data offset values before creating the one or more 3GPP files that comprise live media content. The example live streaming metadata updater 604 retrieves the fragment index values and/or data offset values as soon as they are made available and prepends such values to the live-stream-metafile. As the media event continues, the associated live-stream-metafile grows in size with the most recent fragment index values and most recent data offset values saved at the beginning of the file.

Figure 7:
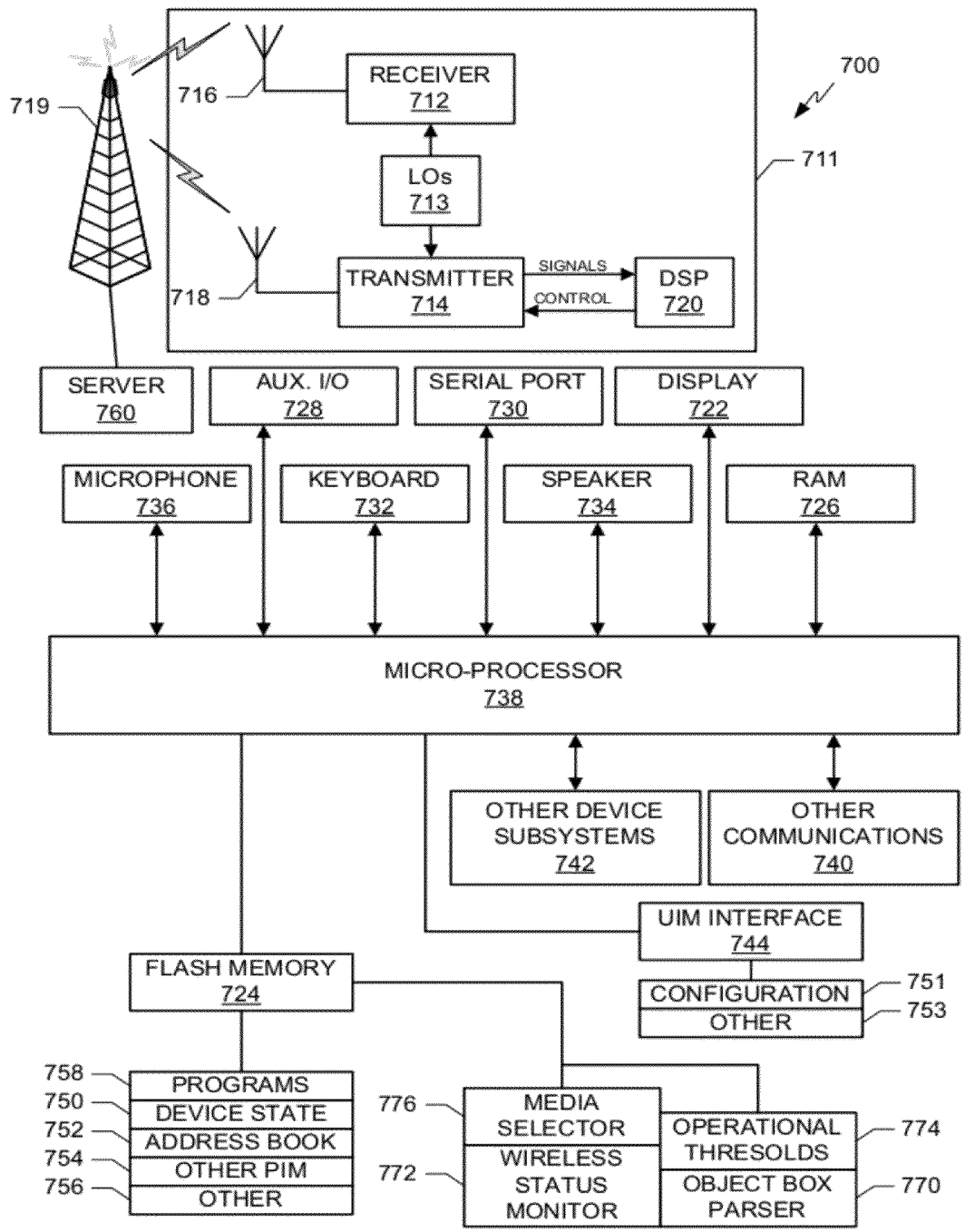
FIG. 7 illustrates an example UE that can be implemented in accordance with this disclosure.

FIG. 7 is an example UE that can be implemented in accordance with this disclosure. UE 700 is preferably a two-way wireless communication device having at least voice and data communication capabilities. UE 700 preferably has the capability to communicate with other computer systems on a network, an intranet, and/or the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. The particular design of the communication subsystem 711 will be dependent upon the communication network in which the device is intended to operate. For example, UE 700 may include a communication subsystem 711 designed to operate within the general packet radio service (GPRS) network and/or UMTS network.

Network access requirements will also vary depending upon the type of network 719. For example, In UMTS and GPRS networks, network access is associated with a subscriber or user of the UE 700. For example, a GPRS mobile device therefore requires a subscriber identity module (SIM) card in order to operate on a GPRS network. In UMTS a universal subscriber identity module (USIM) or SIM module is required. However, in CDMA a removable user identity module (RUIM) card or module is required. These will be referred to as a UIM interface herein. Without a valid UIM interface, a mobile device may not be fully functional. Local or non-network communication functions, as well as legally required functions (if any) such as emergency calling, may be available, but mobile device 700 will be unable to carry out any other functions involving communications over the network. The UIM interface 744 is normally similar to a card-slot into which a card can be inserted and ejected like a diskette or PCMCIA card. The UIM card can have approximately 64K of memory and hold many key configuration 751, and other information 753 such as identification, and subscriber related information.

When required network registration or activation procedures have been completed, UE 700 may send and receive communication signals over the network 719. Signals received by an antenna 716 through the communication network 719 are input to a receiver 712, which may perform such common receiver functions as signal amplification, frequency down conversion, filtering, channel selection and the like, including analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via the antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network 719 may further communicate with multiple systems, including a server 760, such as the example server 104, and other elements (not shown). For example, network 719 may communicate with both an enterprise system and a web client system to accommodate one or more clients with one or more service levels.

UE 700 includes a microprocessor 738 which controls the overall operation of the device. Communication functions, including at least data communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 may be stored in a persistent store such as flash memory 724, which may instead be a read-only memory (ROM) or similar storage element (not shown). Those having ordinary skill in the art will appreciate that the operating system, specific device applications, or parts thereof, may be temporarily loaded into a volatile memory such as RAM 726. Received communication signals may also be stored in RAM 726. Further, a unique identifier is also preferably stored in read-only memory.

As shown, flash memory 724 can be segregated into different areas for both computer programs 758 and program data storage 750, 752, 754 and 756. These different storage types indicate that each program can allocate a portion of flash memory 724 for their own data storage requirements. The flash memory 724 additionally includes an object box parser module 770, a wireless status monitor module 772, an operational thresholds module 774, and a media selector module 776. The object box parser module 770 parses received 3GPP files from the server 104 to identify one or more object boxes of interest. For example, the object box parser module 770 may be configured to identify an instance of the "meta" box 308 and extract the contents therein to identify encoded media configuration options available for streaming. Available media options extracted from the one or more parsed object boxes may be stored in a memory, such as the example flash memory 724 for later retrieval and/or selection. As described above, later retrieval and/or selection of alternate media options having alternate media content may occur when channel conditions of the example UE 102 become unsatisfactory.

The example wireless status monitor 772 monitors operating conditions of the UE 900 and compares measured values to one or more thresholds in the operational thresholds module 774. Measured values that may indicate a quality of service and/or a corresponding ability to satisfactorily render media to a user of the UE 700 include, but are not limited to a bit rate, a latency value, and/or a jitter value. In the event that one or more measured values exceeds a threshold value (e.g., drops below a lower level acceptable limit, increases above a higher level acceptable limit), the example wireless status monitor module 772 may prompt the media selector module 776 to invoke the communication subsystem 711 to retrieve alternate media better suited for the current operating conditions (e.g., select a 3GPP file having a lower resolution).

Figure 8:
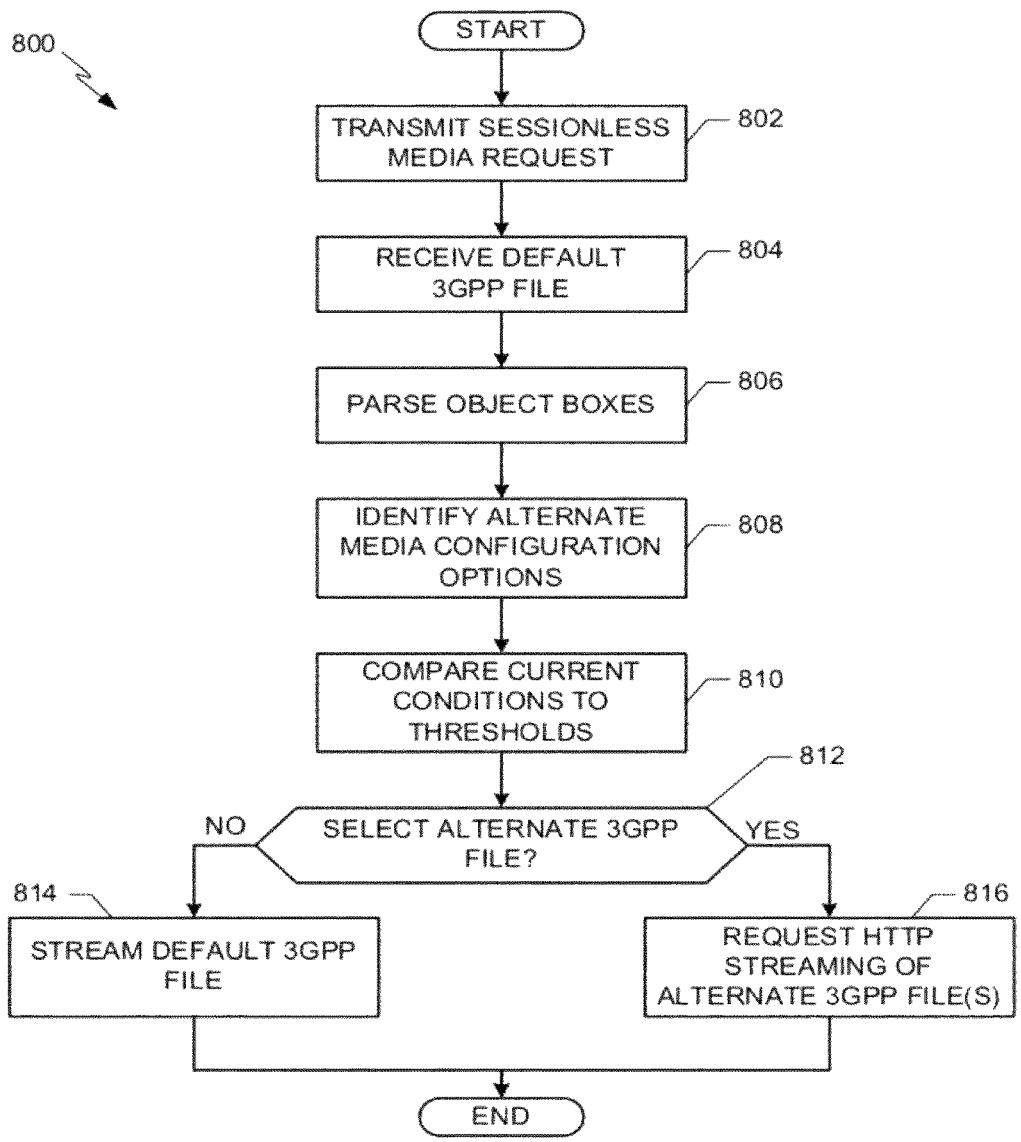
FIGS. 8 and 9 illustrate flowcharts of example processes for facilitating client controlled sessionless adaptation.

FIG. 8 depicts an example flow diagram representative of computer readable instructions that may be used to facilitate client controlled sessionless adaptation. The example operations of FIG. 8 may be performed using a processor, a controller and/or any other suitable processing device. For example, the example operations of FIG. 8 may be implemented using coded instructions stored on a tangible medium such as a flash memory, a read-only memory (ROM) and/or random-access memory (RAM) associated with a processor (e.g., the processor 738 of FIG. 7 and/or the processor 502 of FIG. 5). Alternatively, some or all of the example operations of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example operations of FIG. 8 may be implemented manually or as any combination(s) of any of the foregoing techniques, for example, any combination of firmware, software, discrete logic and/or hardware. Further, although the example operations of FIG. 8 are described with reference to the flow diagram of FIG. 8, other methods of implementing the operations of FIG. 8 may be employed. For example, the order of execution of the blocks may be changed, and/or some of the blocks described may be changed, eliminated, sub-divided, or combined. Additionally, any or all of the example operations of FIG. 8 may be performed sequentially and/or in parallel by, for example, separate processing threads, processors, devices, discrete logic, circuits, etc.

In general, the example flow diagram of FIG. 8 can be used to implement the example UE 700 of FIG. 7 and/or the example exchanges 100, 200, and 250 of FIGS. 1, 2A, and 2B. The example process 800 of FIG. 8 transmits a sessionless media request (block 802) to initiate an instance of media rendering on the example UE 102, 700. In response to sending the sessionless media request (block 802), the UE 102, 700 receives a default 3GPP media file associated with the request (block 804). As described above, the associated media file may be received based on a URL provided by the user of the UE 102, 700 and/or in response to a web link selected by the user. The default 3GPP media file is parsed by the example object box parser 770 to extract one or more object boxes of interest (block 806). In particular, the object box parser 770 may be configured to identify the occurrence of the "meta" box 308 and extract metadata contained therein. Additionally or alternatively, the example object box parser 770 may identify a URL embedded as metadata and/or associated with the "u=" field of the example "hnti" box 402.

Upon obtaining metadata associated with the received 3GPP file, the example object box parser 770 may identify one or more alternate encoded media configuration options available to the UE 102, 700 (block 808). For example, the parsed metadata may identify that one or more alternate 3GPP files are available on the server that have one or more alternate degrees of resolution and/or bitrate. The parsed metadata may also identify one or more locations (e.g., URLs) associated with each available alternate media. To determine whether the default 3GPP file received (block 804) is appropriate for the current UE 102, 700 channel conditions, the example wireless status monitor 772 measures one or more UE operating conditions and compares them to one or more operational thresholds stored in the operational thresholds module 774 (block 810). Additionally or alternatively, the example wireless status monitor 772 may measure one or more UE operating conditions associated with UE performance capabilities. UE performance capabilities may include, but are not limited to a rate at which the UE may render a bit stream prior to buffer overflow and/or a maximum resolution that the UE can process/render. If the comparison with the one or more thresholds indicates that an alternate 3GPP file is not needed (e.g., because current operating conditions and/or UE performance capabilities do not violate one or more thresholds) (block 812), then the example media selector module 776 allows the default 3GPP file to stream and/or otherwise render on the UE 102, 700 (block 814). On the other hand, in the event that an alternate 3GPP file should be selected (block 812) (e.g., because channel conditions associated with the UE 102, 700 are poor), then the example media selector module 776 invokes the example communication subsystem 711 to initiate an HTTP request to the server 104 for the alternate 3GPP file (block 816). As described above, the subsequent HTTP request to the server may include an alternate URL obtained from the prior identification of alternate encoded media configuration options (block 808).

Figure 9:
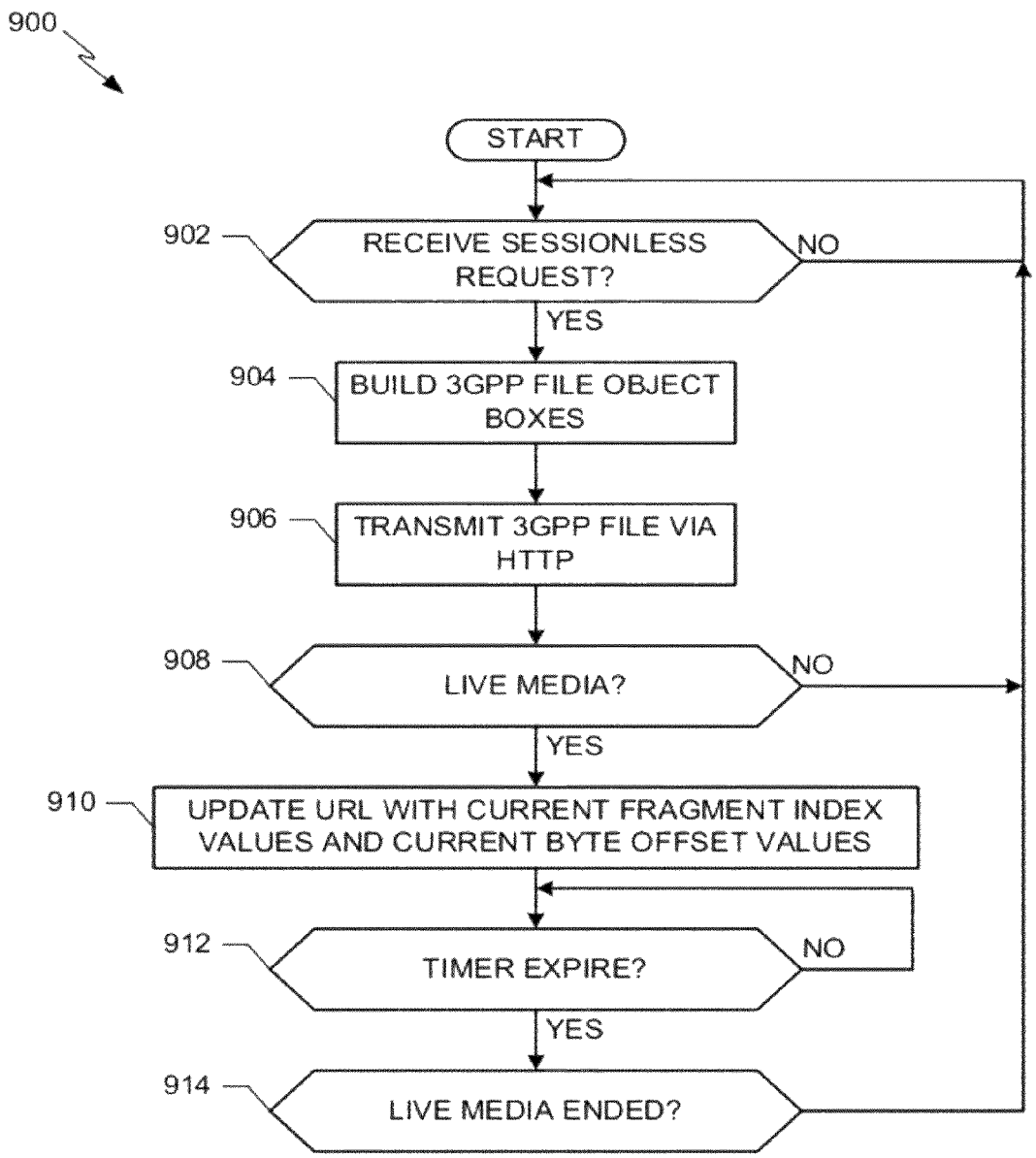

The example flow diagram of FIG. 9 can be used to implement the example server 104 of FIG. 5 and/or the example media file manager 512 of FIGS. 5 and 6, and/or the example exchanges 100, 200, and 250 of FIGS. 1, 2A, and 2B. The example process 900 of FIG. 9 monitors for one or more sessionless HTTP requests (block 902). If no requests are received, the example process 900 of FIG. 9 continues to wait, otherwise the example object box manager 602 of FIG. 6 builds and/or otherwise populates one or more object boxes associated with the requested 3GPP file (block 904). As described above, object boxes of one or more 3GPP files may be arranged and/or built by the party responsible (e.g., a broadcaster) for the media content. The example server 104, via the communication subsystem 510, transmits the 3GPP file to the requesting UE via sessionless HTTP (e.g., in response to an HTTP GET command) (block 906) and, if the media is not associated with a live event (block 908), the example server 104 is finished and continues to wait for other requests (block 902). Without limitation, a stored-content flag may be employed to indicate whether or not the media content creator permits local storage. If not, content may be deleted after it is rendered by the example UE 102, 700. Unlike traditional streaming via RTSP, the methods and apparatus described herein do not inundate the server with onerous processing responsibilities of creating, maintaining, and/or closing a session for every active connection. As such, servers employed with the methods and apparatus described herein may cost less than media servers that facilitate RTSP streaming.

In the event that the media content is associated with a live event (block 908), the example live streaming metadata updater 604 updates the live-stream-metafile to reflect the current file fragment index value(s) and the current data offset value(s) (block 910). As described above, the UE 102, 700 may query the server 104 to obtain such current values to allow seeking of live media (e.g., HTTP GET). The example media file manager 512 waits for a manual signal, a periodic, aperiodic, and/or scheduled time period (block 912) and determines if the live media event is over (block 914). If not, the example live streaming metadata updater 604 updates the live-stream-metafile to reflect the current file fragment index value(s) and the current data offset value(s) (block 910), otherwise the example server 104 waits for another request (block 902). In other examples, the media content provider (e.g., broadcaster) is responsible for updating (e.g., prepending) the example live-stream-metafile.

Microprocessor 738, in addition to its operating system functions, preferably enables execution of software applications on the mobile device. A predetermined set of applications that control basic operations, including at least data and voice communication applications for example, will normally be installed on UE 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the UE 700. These applications will however, according to the above, in many cases need to be approved by a carrier.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of UE 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of UE 700 is similar, except that received signals would preferably be output to a speaker 734 and signals for transmission would be generated by a microphone 736. Alternative voice or audio I/O subsystems, such as a voice message recording subsystem, may also be implemented on UE 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable. Such a port 730 would enable a user to set preferences through an external device or software application and would extend the capabilities of mobile device 700 by providing for information or software downloads to UE 700 other than through a wireless communication network. The alternate download path may for example be used to load an encryption key onto the device through a direct and thus reliable and trusted connection to thereby enable secure device communication.

Alternatively, serial port 730 could be used for other communications, and could include as a universal serial bus (USB) port. An interface is associated with serial port 730.

Other communications subsystems 740, such as a short-range communications subsystem, is a further optional component which may provide for communication between UE 700 and different systems or devices, which need not necessarily be similar devices. For example, the subsystem 740 may include an infrared device and associated circuits and components or a Bluetooth® communication module to provide for communication with similarly enabled systems and devices.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to stream media content via hypertext transfer protocol, the method comprising:
    retrieving metadata for a plurality of encodings of the media content, wherein the metadata includes a first uniform resource locator (URL) and a first set of byte offsets for a first portion of the media content having a first encoding and a second URL and a second set of byte offsets for a second portion of the media content having a second encoding, wherein each of the first portion and the second portion contains a movie fragment based on ISO base media file format; and
    requesting the first portion of the media content utilizing the first URL and the first set of byte offsets.

2. The method of claim 1, wherein each of the first portion and the second portion includes at least one of a moov box, a moof box, ftyp box, or a media data (mdat) box.

3. The method of claim 1, wherein each of the first set of byte offsets and the second set of byte offsets includes a plurality of bytes, each byte of the plurality of bytes being contiguous with one another.

4. The method of claim 1 further comprising downloading the first portion based on a channel condition.

5. The method of claim 4 further comprising downloading the second portion of the media content based on a change in the channel condition.

6. The method of claim 1 wherein the second portion is requested utilizing the second URL and the second set of byte offsets.

7. The method of claim 1 further comprising downloading the first portion of the media content based on a capability of a device.

8. The method of claim 1 further comprising requesting a third portion of the media content utilizing the first URL.

9. A device to stream media content via hyper text transfer protocol, the device comprising:
    a processor configured to:
        receive metadata for a plurality of encodings of the media content, wherein the metadata includes a first uniform resource locator (URL) and a first set of byte offsets for a first portion of the media content having a first encoding and a second URL and a second set of byte offsets for a second portion of the media content having a second encoding, wherein each of the first portion and the second portion contains a movie fragment based on ISO base media file format; and
        request the first portion of the media content utilizing the first URL and the first set of byte offsets.

10. The device of claim 9 wherein each of the first portion and the second portion includes at least one of a moov box, a moof box, ftyp box, or a media data (mdat) box.

11. The device of claim 9, wherein each of the first set of byte offsets and the second set of byte offsets includes a plurality of bytes, each byte of the plurality of bytes being contiguous with one another.

12. The device of claim 9, wherein the processor is further configured to download the first portion based on a channel condition.

13. The device of claim 12, wherein the processor is further configured to download the second portion of the media content based on a change in the channel condition.

14. The device of claim 9, wherein the second portion is requested utilizing the second URL and the second set of byte offsets.

15. The device of claim 9, wherein the processor is further configured to download the first portion of the media content based on a capability of the device.

16. The device of claim 9, wherein the processor is further configured to request a third portion of the media content utilizing the first URL.

17. A method to deliver media content via hyper text transfer protocol, the method comprising:

provide metadata for a plurality of encodings of the media content, wherein the metadata includes a first uniform resource locator (URL) and a first set of byte offsets for a first portion of the media content having a first encoding and a second URL and a second set of byte offsets for a second portion of the media content having a second encoding, wherein each of the first portion and the second portion contains a movie fragment based on ISO base media file format, and the first portion of the media content being provided utilizing the first URL and the first set of byte offsets; and providing the first portion in response to a GET command.

18. The method of claim 17 wherein the first portion is provided based on a channel condition.

19. The method of claim 18 wherein the second portion of the media content is provided based on a change in the channel condition.

20. The method of claim 17 wherein the second portion is provided utilizing the second URL and the second set of byte offsets.

21. The method of claim 17 wherein the first portion of the media content is provided based on a capability of a device.

22. The method of claim 17 further comprising providing a third portion of the media content utilizing the first URL.

23. A device to deliver media content via hyper text transfer protocol, the device comprising:

a processor configured to:

provide metadata for a plurality of encodings of the media content, wherein the metadata includes a first uniform resource locator (URL) and a first set of byte offsets for a first portion of the media content having a first encoding and a second URL and a second set of byte offsets for a second portion of the media content having a second encoding, wherein each of the first portion and the second portion contains a movie fragment based on ISO base media file format, and the first portion of the media content being provided utilizing the first URL and the first set of byte offsets; and providing the first portion in response to a GET command.

24. The device of claim 23 wherein the first portion is provided based on a channel condition.

25. The device of claim 24 wherein the second portion of the media content is provided based on a change in the channel condition.

26. The device of claim 23 wherein the second portion is provided utilizing the second URL and the second set of byte offsets.

27. The device of claim 23 wherein the first portion of the media content is provided based on a capability of a second device.

\* \* \* \* \*